No. 659,649. Patented Oct. 16, 1900.
W. R. CLOUGH.
MACHINE FOR MAKING CORKSCREWS.
(Application filed Mar. 5, 1900.)
(No Model.) 7 Sheets—Sheet 1.

Fig. 1.

Witnesses:
Gunder Gunderson.
Anna V. Broderick.

Inventor
William Rockwell Clough,
By Chas. E. Gill
Attorney.

No. 659,649. Patented Oct. 16, 1900.
W. R. CLOUGH.
MACHINE FOR MAKING CORKSCREWS.
(Application filed Mar. 5, 1900.)

(No Model.) 7 Sheets—Sheet 4.

Witnesses:
Gunder Gunderson
Anna L. Broderick

Inventor
William Rockwell Clough,
By Chas. E. Gill
Attorney.

No. 659,649. Patented Oct. 16, 1900.
W. R. CLOUGH.
MACHINE FOR MAKING CORKSCREWS.
(Application filed Mar. 5, 1900.)
(No Model.) 7 Sheets—Sheet 6.

Witnesses:
Gunder Gunderson
Anna L. Broderick.

Inventor
William Rockwell Clough,
By Chas. C. Gill
Attorney.

No. 659,649. Patented Oct. 16, 1900.
W. R. CLOUGH.
MACHINE FOR MAKING CORKSCREWS.
(Application filed Mar. 5, 1900.)
(No Model.) 7 Sheets—Sheet 7.

Witnesses:
Gunder Gunderson.
Anna V. Broderick.

Inventor
William Rockwell Clough,
By Chas. C. Gill
Attorney.

THE NORRIS PETERS CO., PHOTO-LITHO., WASHINGTON, D. C.

UNITED STATES PATENT OFFICE.

WILLIAM ROCKWELL CLOUGH, OF ALTON, NEW HAMPSHIRE.

MACHINE FOR MAKING CORKSCREWS.

SPECIFICATION forming part of Letters Patent No. 659,649, dated October 16, 1900.

Application filed March 5, 1900. Serial No. 7,328. (No model.)

*To all whom it may concern:*

Be it known that I, WILLIAM ROCKWELL CLOUGH, a citizen of the United States, and a resident of Alton, in the county of Belknap and State of New Hampshire, have invented certain new and useful Improvements in Machines for Making Corkscrews, of which the following is a specification.

The invention relates to improvements in machines for making corkscrews; and it consists in the novel features and combinations of parts hereinafter described and claimed.

In the preferred embodiment of the invention the machine will comprise means for intermittently feeding inward from a reel appropriate lengths of wire for the corkscrews, a rotatory chuck to receive one end of the handle to which the length of wire for the corkscrew is to be secured, means for wrapping the inwardly-fed length of wire around the handle, leaving the portions of said length crossed at said handle, means for then severing the said length of wire from the main body of the wire, means for then twisting the crossed ends of the then severed length of wire to form the shank of the corkscrew, and means for then coiling the remaining portion of the end or ends of said length of wire to form the worm of the screw. The wire is fed into the operative parts of the machine automatically, and the wrapping of the wire around the handle, the severance of the length of wire, and the formation of the twisted shank and coiled worm of the corkscrew are performed by automatic mechanism set in motion from the main driving-shaft. The handles for the corkscrews are fed by hand to the rotatory chuck provided for them, the machine automatically stopping at the completion of each corkscrew, so as to give the operator time to remove the completed corkscrew and supply another handle to the aforesaid chuck preparatory to again starting the machine and making another corkscrew.

In the use of the machine made the subject hereof the corkscrew proper produced thereby comprises a worm, a twisted shank, and an eye, the latter tightly clasping the middle transverse portion of the wood handle, which carries the wire portion of the article. I desire it to be understood, however, that the invention is not in every instance confined to the formation of the eye around the wood or other handle, since in some instances the corkscrew proper will be formed independently of the handle and the handle thereafter applied to the eye or omitted altogether. When the handles are supplied to the machine to receive the wire portion of the article, the wire is wrapped directly upon the handle, and when it is not desired to supply the handles, but simply to form the corkscrews with an eye at the upper end of the shank, the wire in lieu of being wrapped around a removable handle will be wrapped around a stationary stud or dummy handle and thereafter be removed from it.

The invention and satisfactory means for carrying the same into effect will be fully understood from the detailed description hereinafter presented, reference being had to the accompanying drawings, in which—

Fig. 8 is a section thereof on the line 8 8 of Fig. 7.

In said drawings, 25 designates the bed of the machine; 26, a portion of the supporting-legs for same; 27, the main driving-shaft journaled in bearings 28 and provided with the belt-wheel 29, and 30 a clutch mechanism for throwing said main driving-shaft 27 into and out of operation.

I will describe the various mechanisms in the order of their arrangement upon the bed-plate of the machine, and accordingly begin with the means for feeding the strand of wire into the machine, then the means for severing the wire into appropriate lengths, then the means for wrapping the end of the wire around the handle, and, finally, the means for shaping the ends of the severed length of wire into the twisted shank, the stop, and the worm.

31 denotes the wire, which is received from a reel (not shown) suitably supported in rear of the machine. The end of the wire 31 is first passed through any usual wire-straightening device, designated, diagrammatically, at 32, Fig. 1, and to the feed-carriage 35 wherein the same is held by a clutch 36, Figs. 7 and 8, and thence fed forward to the cutting mechanism hereinafter described.

Upon the bed 25 near its center is secured an L-shaped rail or tramway 37, Figs. 1, 3, 7, and 8, upon which the feed-carriage 35 is adapted to ride. The feed-carriage 35 consists of a block of metal having a vertical groove in its under side adapted to fit upon the edge of the rail or tramway 37, a shoulder 38 at its upper edge and a socket 39, within which is a rock-shaft 40, provided at its upper end with a clutch 36, and adjacent to its lower inner end with an arm 41, which extends outward at right angles to said rock-shaft 40 through a slot in the side of the feed-carriage. To the under side of the feed-carriage 35 is secured a guide-plate 42, which extends into the longitudinal groove $37^{\times}$, formed in the side of the rail or tramway 37 and serves to hold the said feed-carriage slidably upon said rail or tramway, and upon the side of said feed-carriage above said guide-plate 42 is secured the upper end of a spring 43, the lower end of which is flexed against the outer surface of the rail or tramway 37 and serves to hold the feed-carriage 35 in its shifted positions.

Figures 3, 6, 7:
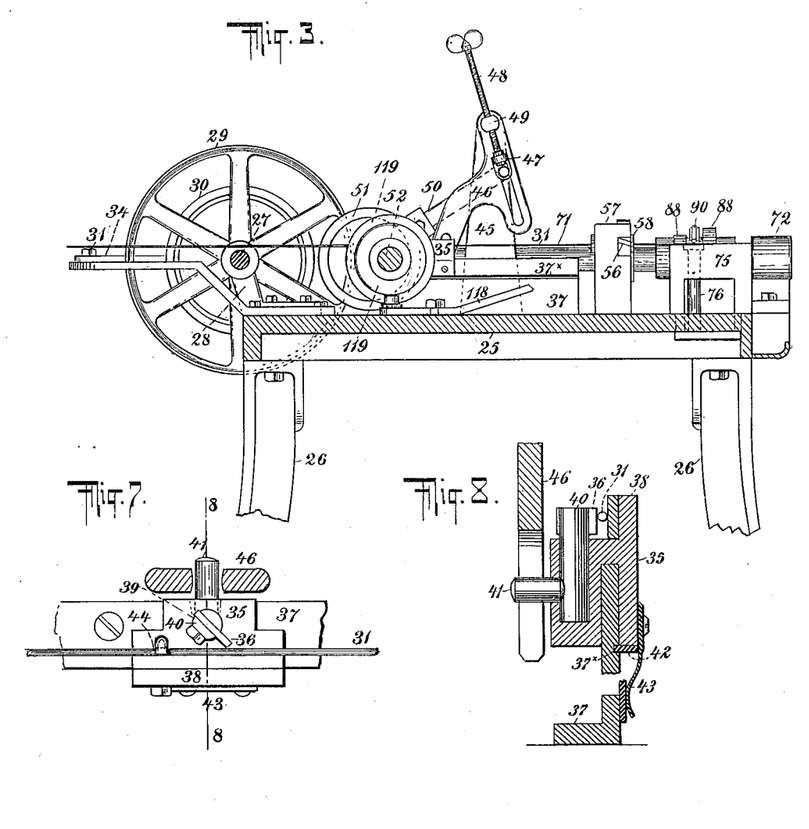
Fig. 3 is a sectional view of same, taken on the line 3 3 of Fig. 1.
Fig. 6 is a vertical sectional view taken on the line 6 6 of Fig. 4.
Fig. 7 is a top view of the feed-carriage and a portion of its rail.

44 denotes a guide-screw, Fig. 7, which extends through the shoulder 38, adjacent to one end of the feed-carriage 35.

45 is a standard, Fig. 3, secured to the bed 25 at the side of the rail or tramway 37, and 46 is a slotted arm having its upper end pivotally secured to the upper end of the standard 45 and its other end similarly secured to the projecting end of the rock-shaft arm 41, which extends outwardly through the side of the feed-carriage 35.

Figure 1:
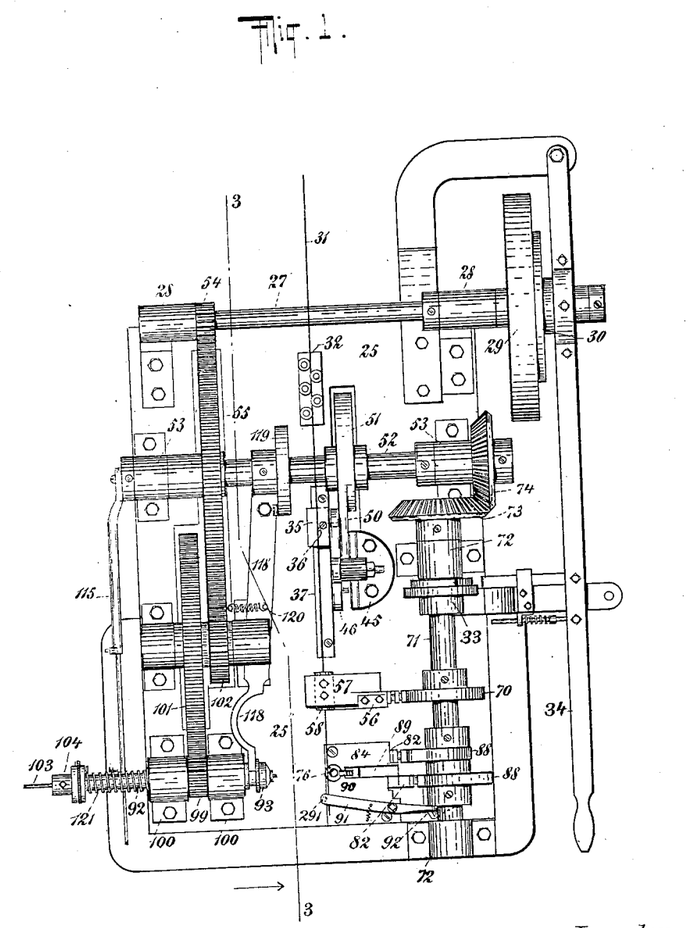
Figure 1 is a plan or top view of a machine constructed in accordance with and embodying my invention.

Within the slot of the arm 46 works a slide 47, provided with an adjusting-screw 48, held in a threaded bearing 49 at the upper end of the arm 46 for regulating the length of feed, and 50 denotes an arm having one end pivotally secured to the slide 47 and its other end strapped on the eccentric 51, secured to the shaft 52, journaled in bearings 53, said shaft 52 deriving its power from the main driving-shaft 27 through the pinion 54 and gear-wheel 55, as shown in Fig. 1. During every revolution of the shaft 52 the feed-carriage 35 is advanced upon the rail or tramway 37 by the arm 50, and thereby caused to feed a definite length of wire forward to the cutting mechanism, and while the length of wire thus fed forward is being severed, wrapped around its handle, and twisted and coiled the carriage 35 is again being moved back to its initial position to advance a new length of wire, the strand of wire 31 being held during the return movement of said feed-carriage 35 by the straightening device 32.

Figure 9:
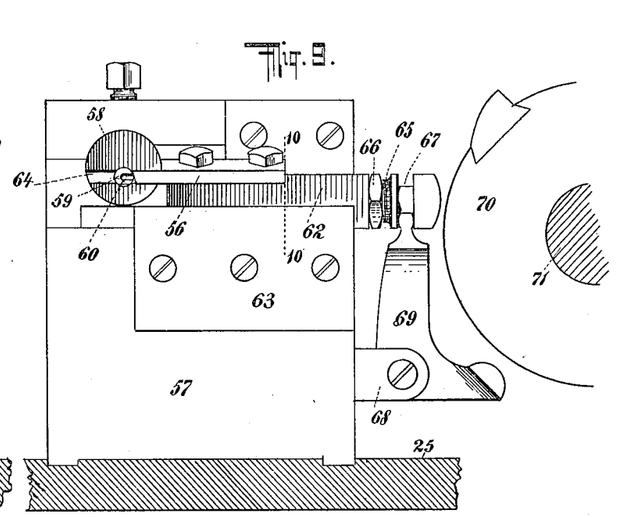
Fig. 9 is an enlarged front view of the cutting mechanism.
Figure 10:
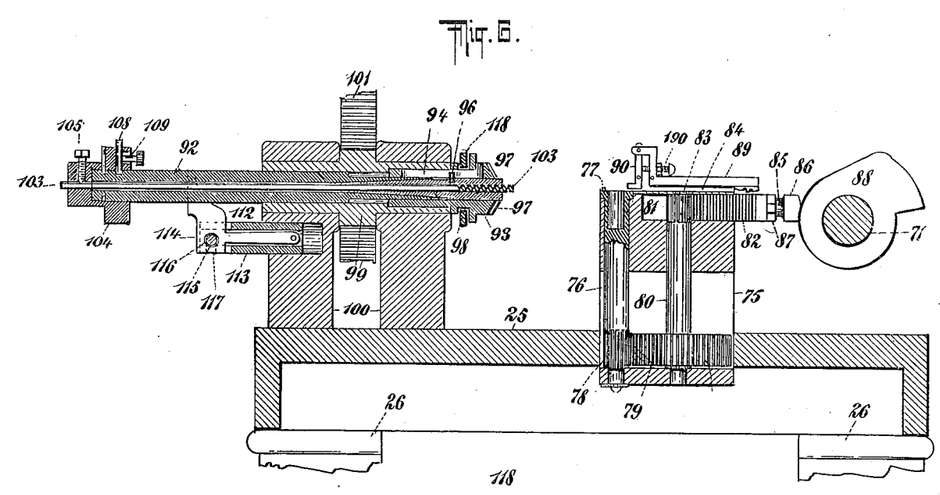
Fig. 10 is a right-hand side view of same with the bar 62 in section on the dotted line 10 10 of Fig. 9.
Figure 11:
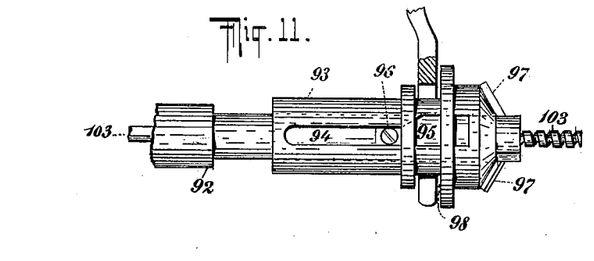
Figs. 11 and 12 are respectively top and end views of the wire twisting and coiling device.
Figure 12:
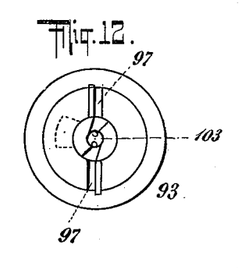

The cutter 56, Figs. 1, 9, and 10, is arranged in a bearing 57, secured upon the bed 25 in front of the forward end of the rail or tramway 37, said bearing 57 having a sleeve 58 secured therein adapted to receive the guide 59, provided with a slot 60, through which the wire passes.

61 denotes a guide arranged in the front end of the bearing 57 to receive the sliding bar 62, which is retained therein by the cheek-plate 63 and carries upon its inner end the inclined cutter 56, which is adapted to move through an inclined slot 64, extending transversely through the sleeve 58 and partly across the front of the bearing 57. To the outer or projecting end of the sliding bar 62 is secured an adjusting-screw 65, Fig. 9, having a jam-nut 66 thereon by means of which screw the cutting edge of the cutter 56 may be adjusted from time to time as the same wears or is ground away. The head of the screw 65 is rounded and provided with an annular groove 67, and upon the side of the bearing 57 directly below the outer end of the adjusting-screw 65 is a bifurcated bearing 68, within which is pivoted a bell-crank lever 69, the end of whose vertical member engages the said annular groove 67, while the end of whose horizontal member is free and rounded off, as shown in Fig. 9. The cutter 56 is moved inward across the path of the wire by the action of the cam-wheel 70, contacting with the head of the adjusting-screw 65 and forcing the same, the sliding bar 62 and cutter 56 inward, causing the latter to sever the end of the wire projecting beyond the end of the guide 59, and as the cam-wheel 70 continues to revolve it next contacts with the rounded end of the horizontal member of the bell-crank lever 69 and in depressing the said end causes the end of its vertical member and the head of the adjusting-screw 65, engaged thereby, to be retracted to their former positions, thereby restoring the cutter 56 to its normal position.

The cam-wheel 70 is mounted upon an auxiliary shaft 71, Fig. 1, journaled in bearings 72 at the right-hand side of the machine, and said shaft 71 receives its motion from the shaft 52 through the bevel-gears 73 and 74.

Figures 4, 5:
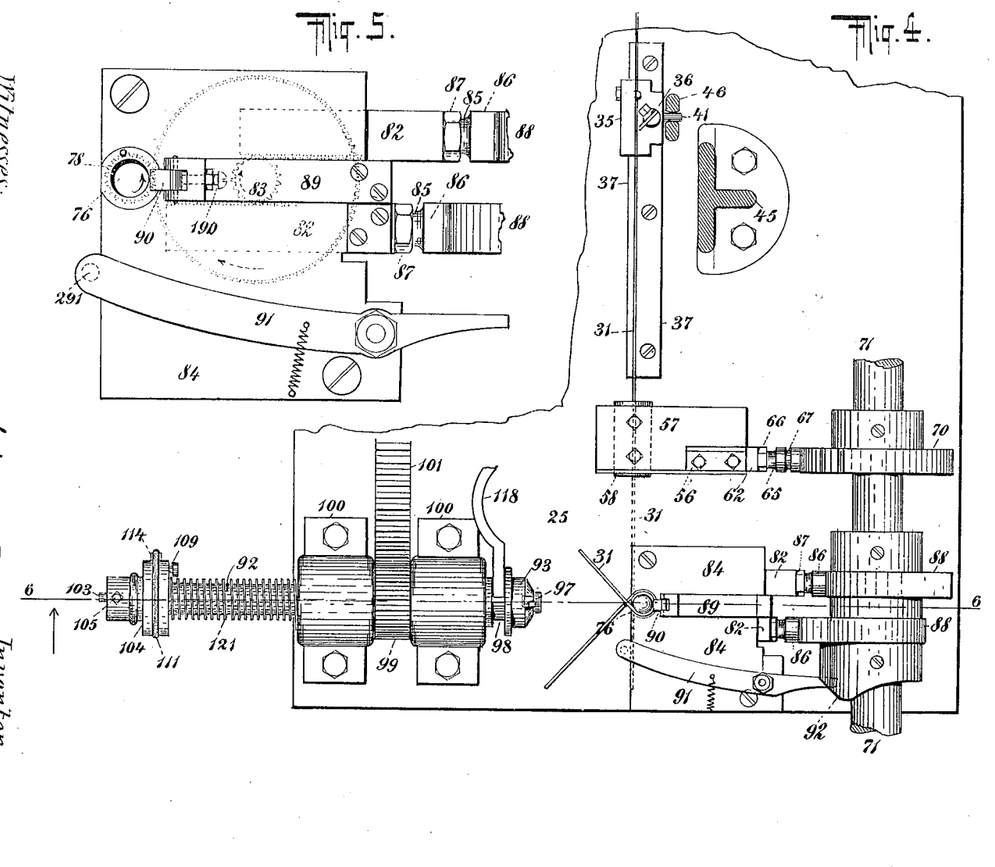
Fig. 4 is an enlarged plan or top view of a portion of the machine, showing the wire feeding, cutting, wrapping, and twisting and coiling mechanisms.
Fig. 5 is a further enlarged top view of a portion of the machine, showing the mechanism for wrapping the wire around the handle.

Near the forward end of the machine and in front of the cutting mechanism is arranged the mechanism for wrapping the wire around the handle of the corkscrew. This mechanism is partly arranged in a frame 75 and comprises a rotatory chuck 76, vertically supported in said frame 75, the upper end of said chuck 76 being hollow or socketed to receive about one transverse half of a corkscrew-handle and provided on its top edge adjacent to said socket with a stud 77, Fig. 13, for holding the wire firmly against the side of the handle and causing the chuck 76 and handle to revolve together. Upon the lower end of the chuck 76 is a pinion 78, Figs. 5 and 6, which meshes with a gear-wheel 79, fixed upon the lower end of the vertical shaft 80 parallel with and at the side of the chuck 76.

In the top of the frame 75 are grooves 81, within which are the toothed sliding rack-bars 82 in mesh with a pinion 83 on the upper end of the shaft 80, the rack-bars 82 and pinion 83 being covered by the top plate 84, secured to the frame 75.

85 85 denote adjusting-screws secured to the outer ends of the sliding rack-bars 82, having rounded heads 86 and jam-nuts 87 thereon. The rack-bars 82 are alternately forced inward to rotate the shaft 80 and handle-chuck 76 through the medium of the cam-wheels 88, secured upon the auxiliary shaft 71, the cam-surfaces of said cam-wheels 88 being oppositely arranged, whereby during each revolution of the shaft 71 the forward rack-bar 82 in being forced inward will rotate the pinion 83 and cause the rear rack-bar 82 to be forced outward, and as soon as the cam-surface of the rear cam-wheel 88 contacts with the head of its adjusting-screw 85 it will force said rack-bar inward, and thereby retract the forward rack-bar to its original position.

Upon the outer end of the forward rack-bar 82 is secured one end of the arm 89, Figs. 1, 4, 5, 6, and 13, the other end of which extends inward slightly above the surface of the top plate 84 and is bent upward and inward again, Fig. 6, and its extreme end bifurcated to receive the upper end of a pivoted toe 90, which bears against the wire on the handle and itself has a bearing against the adjustable stop-screw 190.

Arranged upon the top plate 84, adjacent to its forward end, is a pivoted lever 91, actuated by a cam 92 on the auxiliary shaft 71, which lever 91, after the wire is wrapped around the handle, moves against the wire at the front side of said handle and binds the same against said handle, so as to hold the wire in place during the subsequent twisting and coiling of the wire. The lever 91 has a short downwardly-extending stud 291, which is the part thereof which binds against the wire. The lever 91 coöperates with the toe 90, which also bears against the wire after the latter has been wrapped around the handle, the lever 91 and toe 90 bearing against the wire at different points and pressing the same against the handle. The toe 90 first reaches the wire to press it against the handle, and then the lever 91 at once moves against the wire.

In the operation of wrapping the wire around its handle the forward end of the strand or rod after passing through the guide 59 of the cutting mechanism is passed onward to the rotating chuck 76 and between the stud 77 thereon and the portion of the handle projecting above the top of said chuck 76. As soon as the required length has been fed forward the cam-surface of the cam-wheel 88 will force the forward rack-bar 82 inward, rotate the shaft 80 and chuck 76 in the direction of the arrows, Fig. 5, and cause the forward end of the wire between the handle and stud 77 to be carried around and tightly wrapped upon the handle by the rotary movement of the chuck 76 and handle, and as soon as the free end of the wire has been carried around to about the position indicated at Fig. 4, the cutter 56 will be moved inward by the action of its cam 70 and sever the length of the wire projecting out of the guide 59, and the severed length with its then crossed ends will thereupon be acted upon by the chuck 76 and presented to the coiler and twister, which will by this time have advanced to position to receive the same. The mechanism for twisting and coiling the crossed ends of the severed length of wire then wrapped upon the handle is arranged upon the bed 25 near the left-hand forward end of the machine, Figs. 1, 4, 11, 12, 13, 15, and 16, and consists of a hollow chuck 92, upon the inner end of which is a sleeve 93, provided with an elongated slot 94, having an enlarged inner end 95, a stud 96 being employed to loosely key said sleeve upon the hollow chuck 92 and permit it to reciprocate upon said chuck 92 and rotate therewith. Upon the inner end of the sleeve 93 are arranged the inclined grooves 97 97, which engage the crossed ends of the wire, and adjacent to said end is an annular groove 98.

99 denotes a pinion loosely keyed upon the chuck 92 and journaled in bearings 100, Fig. 6, said pinion receiving its motion from the shaft 52 through the gear-wheels 101, 102, and 55.

Figures 2, 17, 18:
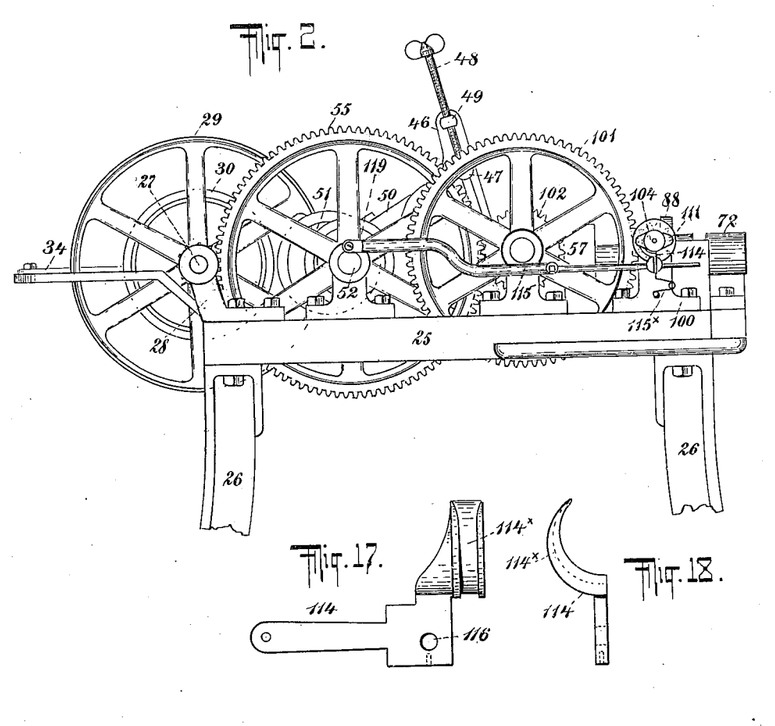
Fig. 2 is a side view of same.
Figs. 17 and 18 are respectively side and end views of the releasing device.

Within the hollow chuck is a spirally-grooved worm-mandrel 103, the rear end of which is secured to said chuck 92 by the tail-stock 104, having a screw 105 therein which impinges against the end of the mandrel 103, a key 106 which extends through said head 104 and into an annular groove 107, provided in the end of the mandrel inclosed by said head 104, whereby to permit of the independent rotary movement of either the mandrel 103 or chuck 92, but prevent any reciprocatory movement of the former within the latter. In the tail-stock 104 is also provided a locking detent 108, having a stem 109, the lower end of said detent extending into a cam-groove 110 in the inclosed end of the hollow chuck 92, and 111 denotes a spring which surrounds the head 104 and presses upon the projecting outer end of the detent 108 to hold its inner end normally against the chuck 92 and the cam-groove 110 therein, said detent 108 serving to hold the chuck 92 and mandrel 103 locked to rotate together until the detent 108 is released by the unlocking device 112. The said locking and unlocking device 112, Fig. 6, comprises a chuck 113 for holding the latch 114 fastened in the front journal-bearing 100. Within said chuck 113 is pivotally supported a latch 114, the outer end of which is rounded and extends upward beside the chuck 92 and is provided with a groove 114$^\times$, and 115 denotes an eccentric-rod, the rear end of which is pivotally secured to a hub on the left-hand end of the shaft 52, Fig. 1, while its other end extends through an eye 116 in the latch 114 and the slot 117 in the end of the chuck 113, and thereby in its forward movement said rod 115 may press down the lock or latch 114 and release the tail-stock 104, which is thereafter locked by the upward pressure of the spring 115$^\times$, as shown in Fig. 2.

The chuck 92 and mandrel 103 therein are moved inward to engage the crossed ends of the wire by the action of the lever 118, pivoted upon the bed 25 and engaged at one end by the cam wheel 119 on the shaft 52 and at its other end is engaged by the annular groove 98 of the sleeve 93, and said chuck 92 is retracted to its original position after each inward movement by the action of the spring 120 on the lever 118, assisted by the spring 121 on the outer end of the chuck 92. In the course of the inward movement of the chuck 92 and mandrel 103 the grooves 97 on the inner end of the sleeve 93 will engage the crossed ends of the wire wrapped around the handle in the chuck 76 and thereupon twist the same, the sleeve 93 receding upon the chuck 92 as the twisting progresses until the stud 96 has entered the enlarged end 95 of the groove 94. Just before this occurs the slotted end of the worm-mandrel 103 will engage the ends of the wire and coil the same to form the short spiral 122 and then the long spiral or worm 123, and as soon as the latter is completed the chuck 92 will have advanced to the point where the end of the latch 114 will be depressed by the eccentric-arm 115, and the groove 114$^\times$ in the latch 114 raise the head of the stem 109 of the detent 108 in the tail-stock 104, and as the latter continues to rotate cause the inner end of said detent 108 to be released of its engagement with the shoulder of the cam-groove 110 in the chuck 92, and thereby break the connection between the mandrel 103 and chuck 92. Thereupon the springs 120 and 121 will retract the lever 118, chuck 92, sleeve 93, and mandrel 103 to their initial positions, and at the same time the spiral end of the mandrel will rapidly unscrew itself from the screw portion of the now-finished corkscrew by the rotary movement of the mandrel 103. At the completion of each revolution of the shaft 52 a stop 33 on the auxiliary shaft 71 throws off the clutch of the driving-pulley 29 and allows the operator to remove the finished corkscrew and feed a new handle to the chuck 76. Thereupon he again sets the machine in operation by moving the lever 34 and forcing the clutch 30 into engagement with the pulley 29.

It will of course be understood that the successive operations of the mechanism above described all take place during a single revolution of the shaft 52, and that with the beginning of its next succeeding revolution the first of the series of operations above described will again take place, and so on.

Figures 13, 14:
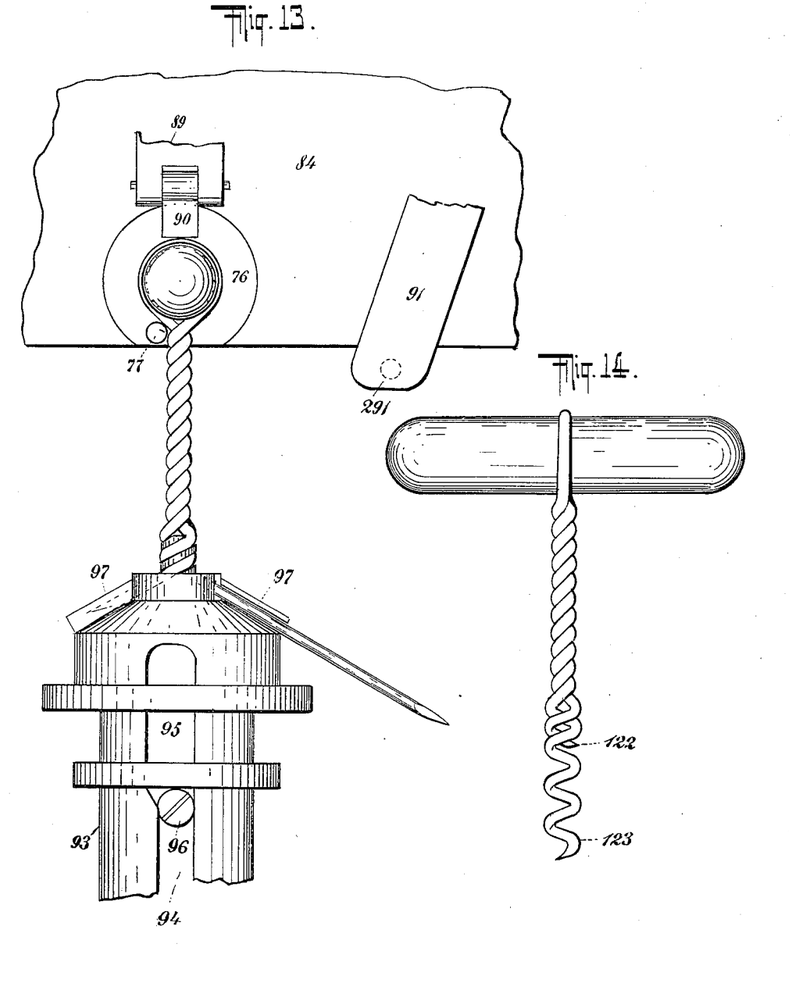
Fig. 13 is a detail top or plan view, greatly enlarged, showing a handle socketed in the wrapping device and the ends of the wire engaged by the twisting and coiling device.
Fig. 14 is a side view of a finished corkscrew.
Figure 15:
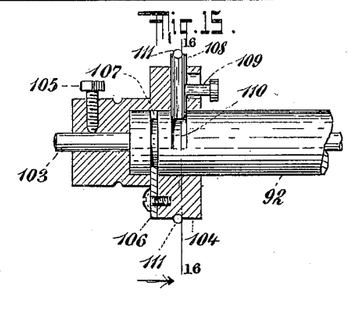
Fig. 15 is an enlarged detail section of the head on the end of the twisting and coiling device.
Figure 16:
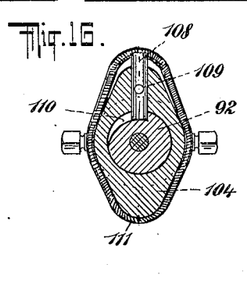
Fig. 16 is a section thereof, taken on the line 16 16 of Fig. 15.

It will be observed that in the use of the machine herein shown and described the length of wire is wrapped around its handle once only, as indicated in Fig. 14; but when more wrappings are desired or required it simply becomes necessary to change the gearing in the frame 75 in a well-known manner to increase the rotations of the chuck 76, and should I desire to dispense with the handle and form a corkscrew with a ring or loop only I should substitute a metal stud for a handle in the chuck 76, upon which stud the ring or loop would then be formed in the same manner as though said stud were an ordinary handle.

What I claim as my invention, and desire to secure by Letters Patent, is—

1. In a machine for making corkscrews from a rod of wire, a chuck for detachably receiving the handle for the corkscrew, and means for forming the said rod around said handle and crossing the ends of same at one side of said handle, combined with means for engaging the crossed ends of the rod of wire and acting upon the same to complete the corkscrew; substantially as set forth.

2. In a machine for making corkscrews from a rod of wire, a chuck for detachably receiving the handle for the corkscrew, and means for forming the said rod around said handle and crossing the ends of same, combined with means for engaging the crossed ends of the rod of wire and twisting same together to form the twisted shank of the corkscrew, and means for then forming the worm at the end of said shank; substantially as set forth.

3. In a machine for making corkscrews from a rod of wire, means for forming an eye in the wire and crossing the end portions of the wire at one side of said eye, and means for maintaining the integrity of said eye during the further manipulation of the wire, combined with the twister for engaging the crossed end portions of the wire and twisting the same together to form the elongated twisted shank of the corkscrew, the spirally-grooved mandrel within said twister for forming the worm at the end of said shank, and means for operating said twister and mandrel; substantially as set forth.

4. In a machine for making corkscrews, the feed-carriage for feeding inward a predetermined length of wire from a reel, means for detachably receiving the handle for the corkscrew, and means for forming the advanced length of the wire around the said handle and crossing the portions of same at one side of the said handle, combined with means for then severing the predetermined length of wire, means for then engaging the crossed ends of said length of wire and twisting the same together to form the twisted shank of the corkscrew, and means for then forming the worm at the end of said shank; substantially as set forth.

5. In a machine for making corkscrews, a feed-carriage for the wire, and a cutter for severing the lengths of wire, combined with the revoluble handle-chuck having a pinion thereon, a shaft having a gear-wheel in mesh with said pinion, a pinion on said shaft, sliding rack-bars meshing with the pinion on said shaft adapted to rotate said shaft and chuck as said rack-bars are moved and wrap the length of the wire about its handle, and rotatory twisting and coiling devices adapted to engage the ends of the length of wire to twist the same and form the worm or coil; substantially as specified.

6. In a machine for making corkscrews, a feed-carriage for the wire, a cutter for severing the lengths of wire, a frame, and a revoluble handle-chuck supported vertically therein having a pinion at its lower end, combined with a shaft vertically supported in said frame, a gear-wheel on said shaft in mesh with the pinion on the handle-chuck, a pinion on said shaft, sliding rack-bars having their teeth in mesh with the said pinion on said shaft and adapted to move alternately to rotate the shaft and handle-chuck and wrap the wire around the handle, a reciprocating rotatory worm-mandrel, and a twister loosely keyed to said mandrel and provided with grooves adapted to engage the ends of the wrapped length of wire to twist the same and finally form the coil; substantially as specified.

7. In a machine for making corkscrews, a cutting mechanism, comprising a guide for the wire, a bearing for said guide, a sliding bar arranged at right angles to the guide in a groove in said bearing, a cutter secured to said sliding bar, and a bell-crank supported in bearings below the sliding bar, having one member in engagement with the outer end of the sliding bar and the end of its other member free, combined with a cam adapted to contact with the outer end of said sliding bar and the free end of the bell-crank to reciprocate said sliding bar and cutter; substantially as specified.

8. In a machine for making corkscrews, the rotatory chuck having the stud to engage the advanced portion of the wire and carry the same around to form the eye therein, and means for then engaging said eye to hold the same stationary during the subsequent treatment of the wire, combined with means for then engaging the crossed ends of the wire and twisting the same together to form the shank, and a spirally-grooved mandrel for then forming the worm or coil of the corkscrew; substantially as set forth.

9. In a machine for making corkscrews, the feed-carriage for feeding inward a predetermined length of wire from a reel, and a hollow rotatory chuck to detachably receive the handle for the corkscrew and to engage the advanced length of the wire fed inward and form the same around the said handle, leaving said length of the wire crossed at one side of said handle, combined with means for then severing the predetermined length of wire, and means for engaging the crossed ends of said length of wire and acting upon the same to complete the corkscrew; substantially as set forth.

10. In a machine for making corkscrews, the rotatory chuck for receiving the handle and wrapping the rod of wire around the same, leaving the ends of said rod of wire crossed, combined with the twisting and coiling devices to engage the said crossed ends of the wire and form therefrom the shank and worm of the corkscrew, said twisting and coiling devices comprising the reciprocatory and rotatory chuck, the sleeve keyed thereon and having the grooves to engage said crossed ends of the wire and form said shank, the spirally-grooved mandrel within said chuck to form the worm, the tail-stock secured to said mandrel and keyed to said chuck, and means for releasing the mandrel from its engagement with said chuck; substantially as set forth.

Signed at Alton, in the county of Belknap and State of New Hampshire, this 28th day of February, A. D. 1900.

WILLIAM ROCKWELL CLOUGH.

Witnesses:
JEREMIAH JONES,
PERRY S. JONES.